Patented Apr. 20, 1926.

1,581,413

UNITED STATES PATENT OFFICE.

RAYMOND M. YOAKAM, OF LIMA, OHIO.

PAINT AND VARNISH REMOVING COMPOSITION.

No Drawing.    Application filed April 5, 1924. Serial No. 704,491.

*To all whom it may concern:*

Be it known that I, RAYMOND M. YOAKAM, a citizen of the United States, and resident of Lima, in the county of Allen and State of Ohio, have invented certain new and useful Improvements in Paint and Varnish Removing Composition; and I do hereby declare the following to be a full, clear, and exact description of the invention, such as will enable others skilled in the art to which it appertains to make and use the same.

This invention relates to improvements in compositions of matter for use in removing paint or varnish,—one object of the invention being to provide a compound for the purpose stated, which shall be made and sold in dry form and which will not deteriorate but will retain all of its properties until used.

A further object is to provide a paint and varnish removing compound which shall be comparatively cheap in cost; which will, upon mixture with water, be made at once ready for use, and which will not injure the object from which the paint or varnish is to be removed.

A further object is to provide a compound, with the use of which paint or varnish can be rapidly and effectually removed from metal.

With these and other objects in view, the invention consists of a compound comprising ingredients as more fully hereinafter set forth and pointed out in the claim.

My improved compound comprises, in the proportions approximately as specified, the following ingredients:

| | Ounces |
|---|---|
| Lye, preferably sodium hydroxide (NaOH) | $11\tfrac{1}{8}$ |
| Soda, preferably sodium mono-carbonate ($Na_2CO_3$) | $\tfrac{1}{4}$ |
| Sal-ammoniac (ammonium chloride, $NH_4Cl$) | $\tfrac{1}{4}$ |
| Carbide (calcium carbide $CaC_2$) | $\tfrac{1}{8}$ |
| A filler, as starch ($C_6H_{10}O_5$)n | 2 |

In making the compound ready for application in removing paint or varnish from an object, the contents of a can in which the material is packed and shipped in dry state will be mixed with a suitable quantity of water. The quantity of material in accordance with the amounts of the ingredients above stated may be mixed with approximately three (3) quarts of water, and may then be at once applied to the paint or varnish to be removed. The sodium hydroxide will act to dissolve and destroy organic constituents of paint or varnish and attacks and combines with mineral bases of paints. The said sodium hydroxide or lye will liberate ammonia gas from the sal-ammoniac when in combination with water as prepared for use. Sodium carbonate, ammonia gas, and sodium hydroxide all act as vigorous color and dye destroyers and decolorizers. Calcium carbide forms acetylene gas in combination with water, thereby promoting solution of all active ingredients and also forms slaked lime with further resulting action in the liberation of ammonia gas from the sal-ammoniac. Starch is used to thicken the wet mixture, to promote uniformity of the dry mixture, and to retard evaporation of water while in use.

Having fully described my invention what I claim as new and desire to secure by Letters-Patent, is:

A dry compound for a paint or varnish remover, comprising the following ingredients in the proportions substantially as specified, sodium hydroxide $11\tfrac{1}{8}$ oz., sodium mono-carbonate $\tfrac{1}{4}$ oz., ammonium chloride $\tfrac{1}{4}$ oz., calcium carbide $\tfrac{1}{8}$ oz., and starch 2 oz.

In testimony whereof, I have signed this specification.

RAYMOND M. YOAKAM.